United States Patent
Wakutsu

(10) Patent No.: US 8,102,757 B2
(45) Date of Patent: Jan. 24, 2012

(54) WIRELESS COMMUNICATION APPARATUS

(75) Inventor: Takashi Wakutsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 12/556,609

(22) Filed: Sep. 10, 2009

(65) Prior Publication Data

US 2010/0118692 A1     May 13, 2010

(30) Foreign Application Priority Data

Nov. 12, 2008    (JP) ................................ 2008-290068

(51) Int. Cl.
*H04J 11/00* (2006.01)
(52) U.S. Cl. ......................................... 370/210; 370/338
(58) Field of Classification Search .................. 370/203, 370/210, 310, 328, 338, 208; 455/130, 334, 455/343.1
See application file for complete search history.

(56) References Cited

U.S. PATENT DOCUMENTS

| | | | |
|---|---|---|---|
| 6,192,026 B1* | 2/2001 | Pollack et al. ................ | 370/203 |
| 2005/0063331 A1* | 3/2005 | Kim et al. ..................... | 370/328 |
| 2006/0195752 A1* | 8/2006 | Walker et al. ................. | 714/748 |
| 2008/0107056 A1* | 5/2008 | Choi et al. .................... | 370/311 |
| 2010/0062739 A1* | 3/2010 | Hozumi et al. ............. | 455/343.1 |
| 2010/0070786 A1* | 3/2010 | Qing et al. ................... | 713/321 |
| 2010/0103848 A1* | 4/2010 | Chin et al. .................... | 370/311 |

FOREIGN PATENT DOCUMENTS

| | | |
|---|---|---|
| JP | 08-116289 | 5/1996 |
| JP | 2004-112847 | 4/2004 |

* cited by examiner

*Primary Examiner* — Chi Pham
*Assistant Examiner* — Robert Lopata
(74) *Attorney, Agent, or Firm* — Turocy & Watson, LLP

(57) ABSTRACT

A wireless transmission apparatus is a wireless communication apparatus constituting a base station capable of communicating with one or more terminals, via a wireless LAN, the wireless communication apparatus including: an inverse fast Fourier transform processing section configured to obtain an output signal sequence in a time region from an input signal sequence in a frequency region; and a control section configured to use an output of the inverse fast Fourier transform processing section in the case of giving a signal sequence in which a same pattern is repeated for subcarrier indexes of the inverse fast Fourier transform processing section, to the inverse fast Fourier transform processing section as the input signal sequence, as a wakeup signal, in order to cause the terminal in a sleep mode to transition to an active mode.

18 Claims, 4 Drawing Sheets

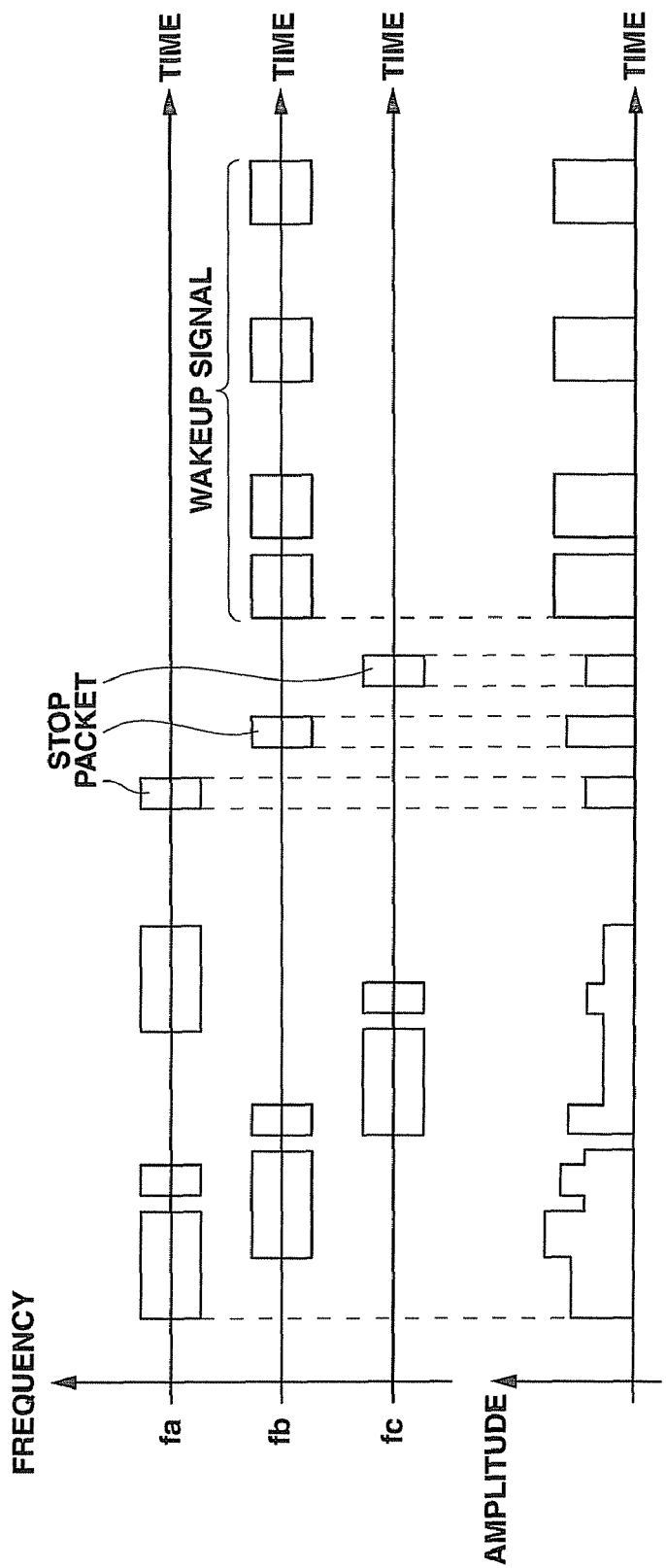

WIRELESS COMMUNICATION APPARATUS

CROSS REFERENCE TO RELATED APPLICATION

This application is based upon and claims the benefit of priority from the prior Japanese Patent Application No. 2008-290068 filed in Japan on Nov. 12, 2008; the entire contents of which are incorporated herein by reference.

BACKGROUND OF THE INVENTION

1. Field of the Invention

The present invention relates to a wireless communication apparatus capable of performing power supply control of a terminal.

2. Description of Related Art

With development of LAN (Local Area Network) technology, networking of information equipment, household electrical appliances and the like has been advancing. Recently, it is common to build a network by combining a wired LAN and a wireless LAN.

For example, a wireless base station is connected to a wired LAN, and the base station is connected to multiple terminals via a wireless LAN. Such a wireless LAN is advantageous in that wiring laying is not required because radio waves, infrared rays or the like is used as a transmission line, and, therefore, it is easy to newly build a network or change layout.

Introduction of such a wireless LAN has been spurred by standardization by IEEE802.11. In IEEE802.11, specifications for 2.4 GHz band wireless LAN and specifications for 5 GHz band wireless LAN were completed in 1997 and 1999, respectively. In these wireless LAN specifications, lower power consumption technology is also standardized.

There is a possibility that a wireless communication apparatus in conformity with the IEEE802.11 standards is used in various environments. For example, it is conceivable that the wireless communication apparatus is used to build a home network in a home. In a home network, a station (hereinafter, also referred to as a STA), such as a digital TV, a DVD and a PC, wirelessly accesses an access point (hereinafter, also referred to as an AP) of a home server or the like. Thereby, wireless communication of data, such as an AV stream and a PC network stream, becomes possible between the STA and the AP.

In the IEEE802.11 standards, an access point manages each station within a wireless network. For this management, the access point assigns an association number to each station and transmits a management frame (beacon frame) to each station.

On the other hand, each station may operate in a power save mode in which a power supply for a wireless function is turned off to lower power consumption. Even in this case also, each station needs to receive the beacon frame in a predetermined cycle according to the beacon cycle in order to check whether there is data destined to the station itself, which has been relayed via the access point. That is, each station needs to turn on the power supply for the wireless function at least in the predetermined cycle to receive the beacon frame.

However, in actual use of a home network apparatus constituting a station, it is necessary to turn on the power supply for the wireless function when a power supply for main body functions is turned on or only for a extremely limited period, and the specification specifying that the power supply is turned on each predetermined cycle cannot achieve sufficient low power consumption.

Accordingly, it is conceivable to enable each station to perform an intermittent operation by accepting a wireless wakeup signal from the access point only when necessary. In order to enable such an intermittent operation, power is continuously supplied only to a part which controls the power supply for the wireless function, between the main body functions and the wireless function of each station, and the power supply for the wireless function is turned on by a wakeup signal. Thereby, it is possible to achieve sufficiently low power consumption. For example, Japanese Patent Application Laid-Open Publication No. 08-116289 discloses an apparatus which wakes up in response to obtaining a detection output with a predetermined strength.

It is also necessary to realize sufficiently low power consumption for the part which controls the power supply for the wireless function because it is necessary to continuously supply power to the part. However, it is conceivable that, if it is attempted to reduce power consumption of the part which controls the power supply for the wireless function, sensitivity of receiving a wakeup signal decreases for the reason of circuit configuration, a wakeup signal detection error occurs, and the power supply for the wireless function cannot be turned on.

BRIEF SUMMARY OF THE INVENTION

A wireless communication apparatus according to an aspect of the present invention is a wireless communication apparatus constituting a base station capable of communicating with one or more terminals having an active mode and a sleep mode as power-supply-on modes, via a wireless LAN, the wireless communication apparatus including: an inverse fast Fourier transform processing section configured to obtain an output signal sequence in a time region by inverse fast Fourier transform processing for an input signal sequence in a frequency region; and a control section configured to use an output of the inverse fast Fourier transform processing section in the case of giving a signal sequence in which a same pattern is repeated for subcarrier indexes of the inverse fast Fourier transform processing section, to the inverse fast Fourier transform processing section as the input signal sequence, as a wakeup signal, in order to cause the terminal in the sleep mode to transition to the active mode.

A wireless communication apparatus according to another aspect of the present invention is a wireless communication apparatus constituting a base station capable of communicating with one or more terminals having an active mode and a sleep mode as power-supply-on modes, via a wireless LAN, the wireless communication apparatus including: an inverse fast Fourier transform processing section configured to obtain an output signal sequence in a time region by inverse fast Fourier transform processing for an input signal sequence in a frequency region; and a control section configured to generate the input signal sequence in a manner that an output of the inverse fast Fourier transform processing section has a pulse peak with a predetermined amplitude in a repeated cycle and has an amplitude of 0 during other periods to generate the wakeup signal, in order to cause the terminal in the sleep mode to transition to the active mode.

A wireless communication apparatus according to still another aspect of the present invention is a wireless communication apparatus capable of performing communication between one or more terminals having an active mode and a sleep mode as power-supply-on modes and a base station via a wireless LAN; wherein the base station includes: an inverse fast Fourier transform processing section configured to obtain an output signal sequence in a time region by inverse fast Fourier transform processing for an input signal sequence in a frequency region; and a control section configured to use an output of the inverse fast Fourier transform processing section in the case of giving a signal sequence in which a same pattern is repeated for subcarrier indexes of the inverse fast Fourier transform processing section, to the inverse fast Fourier transform processing section as the input signal sequence, as a wakeup signal, in order to cause the terminal in the sleep mode to transition to the active mode; and the terminal includes: a power supply control section configured to, by operating during the sleep mode, receiving the wakeup signal transmitted from the base station and detecting the wakeup signal on the basis of an envelope detection output of the wakeup signal, cause the sleep mode to transition to the active mode.

BRIEF DESCRIPTION OF THE DRAWINGS

FIG. 8 is a timing chart showing a third embodiment of the present invention.

DETAILED DESCRIPTION OF THE INVENTION

Embodiments of the present invention will be described in detail below with reference to drawings.

First Embodiment

Figure 1:
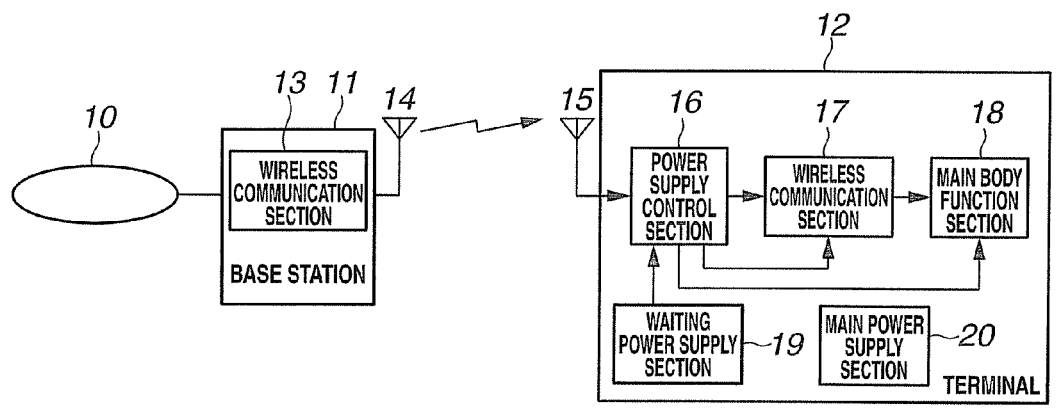
FIG. 1 is a block diagram showing a wireless communication apparatus according to a first embodiment of the present invention.
Figure 2:
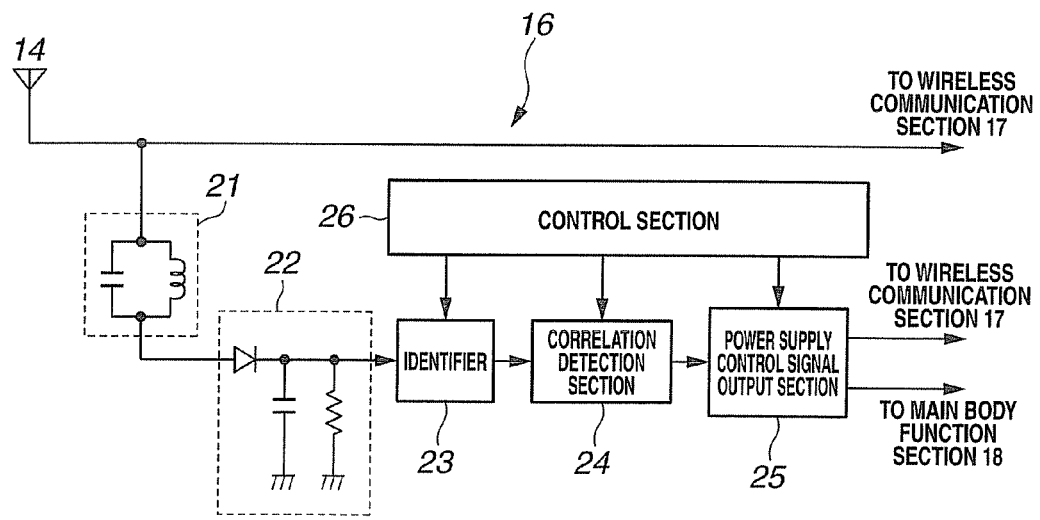
FIG. 2 is a block diagram showing a concrete configuration of a power supply control section 16 in FIG. 1.

FIG. 1 is a block diagram showing a wireless communication apparatus according to a first embodiment of the present invention. FIG. 2 is a block diagram showing a concrete configuration of a power supply control section 16 in FIG. 1.

The wireless communication apparatus in FIG. 1 has a base station 11 and multiple terminals 12 (only one terminal is shown in FIG. 1). The base station 11 is connected to an external network 10 and is adapted to be able to relay connection between the network 10 and each terminal 12 by a wireless communication section 13. The wireless communication section 13 can transmit/receive a signal to/from each terminal 12 via antennas 14 and 15 using a wireless LAN. The terminal 12 can transmit/receive a signal to/from the wireless communication section 13 via the antennas 14 and 15.

When the wireless communication apparatus in FIG. 1 is applied to a home network, the base station 11 corresponds to an access point, and the terminal 12 corresponds to a station. The base station 11 and the terminal 12 can be configured, for example, by a set top box, a mobile information terminal, a video recorder, a TV receiver or the like.

In FIG. 1, the terminal 12 is configured by a power supply control section 16, a wireless communication section 17, a main body function section 18, a waiting power supply section 19 and a main power supply section 20. The main body function section 18 is a part configured to realize the original functions of the terminal 12. The wireless communication section 17 is capable of performing communication via a wireless LAN. The wireless communication section 17 receives a wireless signal via the antenna 15 and outputs the received wireless signal to the main body function section 18, and the wireless communication section 17 also converts a signal outputted from the main body function section 18 to a wireless signal and transmits the wireless signal via the antenna 15.

The main body function section 18 and the wireless communication section 17 are supplied with power from the main power supply section 20 configured to supply power to the main body function section 18 and the wireless communication section 17. That is, the terminal 12 is configured to be able to turn on the main power supply section 20 configured to supply power to the main body function section 18 and the wireless communication section 17, by a wakeup signal from the base station 11.

That is, the main power supply section 20 is adapted so that on/off of the main power supply section 20 is controlled by the power supply control section 16. The waiting power supply section 19 is adapted to continuously generate power and supply the power to the power supply control section 16 irrespective of whether the main power supply section 20 is on or off. The power supply control section 16 is adapted to operate by power supply from the waiting power supply section 19, detect a wakeup signal included in radio waves received by the antenna 15 and control on/off of the main power supply section 20.

That is, the terminal 12 is provided with two modes of an active mode for turning on the main power supply section 20 configured to supply power to the main body function section 18 and the wireless communication section 17 and a sleep mode for turning off the main power supply section 20. During the sleep mode, only the power supply control section 16 is on, and the main power supply section 20 is off. Thereby, it is possible to achieve sufficiently low power consumption. The terminal 12 turns on the main power supply section 20 only when receiving a wakeup signal transmitted from the base station 11.

In FIG. 2, the power supply control section 16 is provided with a tuning section 21 configured by a capacitor and a coil and a detection section 22 configured by a diode, a capacitor and a resistance. Only a predetermined frequency band of a high-frequency (RF) signal induced to the antenna 15 is selected by the tuning section 21. The detection section 22 takes out detection output, which is the envelope amplitude of the input RF signal, by envelope detection.

The detection output is given to an identifier 23, and the identifier 23 performs sampling of the detection output in a predetermined cycle and acquires a logical value pattern from the detection output as an identification result on the basis of level comparison with a predetermined threshold. The identification result is given to a correlation detection section 24. For each terminal, a predetermined logical value pattern is set for a wakeup signal from the base station 11. The correlation detection section 24 determines correlation between the identification result logical value pattern and a logical value pattern set in advance as a wakeup signal for the terminal 12 including the correlation detection section 24. If the identification result logical value pattern and the logical value pattern set in advance agree with each other, the correlation detection section 24 detects that a wakeup signal destined to the terminal 12 including the correlation detection section 24 has been transmitted from the base station 11.

When detecting that a wakeup signal has been received, the correlation detection section 24 outputs a detection signal to a power supply control signal output section 25. When being shown that a wakeup signal has been detected, the power supply control signal output section 25 generates and outputs a power supply control signal for turning on the main power supply section 20 configured to supply power to the wireless communication section 17 and the main body function section 18. An amplifier can be inserted between the signal processing blocks as appropriate, though it is not shown in FIG. 2.

As described above, the power supply control section 16 in FIG. 2 monitors RF signals from the base station 11, detects that a wakeup signal destined to the terminal 12 including the power supply control section 16 has been received, and outputs a power supply control signal for turning the main power supply section 20 to set the active mode when the wakeup signal is received.

Even when the terminal 12 is in the sleep mode, power is supplied to the power supply control section 16. Therefore, in order to realize low power consumption, the power supply control section 16 is required to have a simple circuit configuration with a low power consumption. For example, in order to sufficiently suppress power consumption, it is desirable that the wakeup signal has an on/off keying waveform with a low rate. However, the receiving sensitivity of the high-frequency section configured by the tuning section 21 and the detection section 22 of the power supply control section 16 is relatively low because such a simple circuit configuration is adopted.

Therefore, as for the wakeup signal from the base station 11, it is necessary to set the envelope wave height value thereof as high as possible. In a wireless LAN, however, measures are commonly taken to reduce the peak amplitude of a transmission packet, and therefore, the envelope amplitude is relatively small. Furthermore, it is also necessary that the wakeup signal is in accordance with the wireless system specifications of the wireless communication sections 13 and 17 of the base station 11 and the terminal 12. This is because the wireless communication sections 13 and 17 need to generate a wakeup signal in accordance with the wireless LAN specifications in order to secure compatibility with other wireless LAN equipment.

That is, the wireless communication section 13 of the base station 11 is required to generate a wakeup signal in the on/off keying waveform while being in conformity with the wireless LAN specifications, and, furthermore, the generated wakeup signal is required to have a sufficiently large envelope wave height value. Furthermore, it is desirable that the number of circuits to be added to an existence circuit configuration realizing a wireless LAN is as small as possible.

Figure 3:
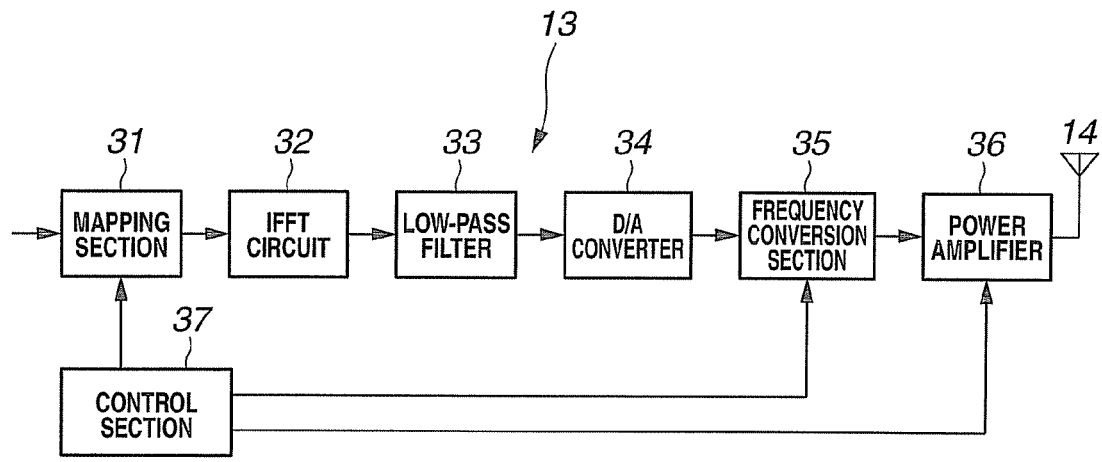
FIG. 3 is a block diagram showing a concrete configuration of a wireless communication section 13 in FIG. 1.
Figure 4A:
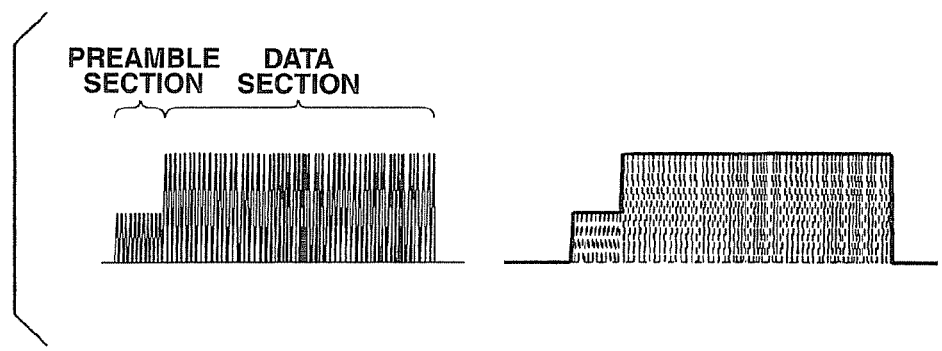
FIGS. 4A and 4B are waveform diagrams for illustrating the embodiment.
Figure 4B:
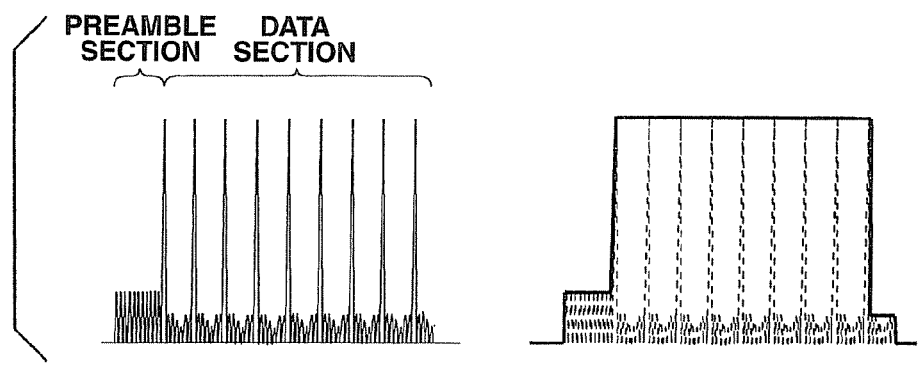

FIG. 3 is a block diagram showing a concrete configuration of the wireless communication section 13 in FIG. 1. FIGS. 4A and 4B are waveform diagrams for illustrating the embodiment.

First, the wakeup signal generated at the wireless communication section 13 will be described with reference to FIGS. 4A and 4B. The left side of FIG. 4A shows a time response waveform of an ordinary wireless LAN packet, and the right side of FIG. 4A shows an envelope detection output in the case of receiving the packet on the left side of FIG. 4A. The left side of FIG. 4B shows a time response waveform of the wireless LAN packet of a wakeup signal, and the right side of FIG. 4B shows an envelope detection output in the case of receiving the signal on the left side of FIG. 4B.

In a wireless LAN adopted by the wireless communication sections 13 and 17, OFDM signals are used as wireless signals to be transmitted and received. The left sides of FIGS. 4A and 4B show a wireless LAN packet transmitting an OFDM signal. At the top of the wireless LAN packet of the OFDM signal, a preamble section, which is an already-known signal sequence, is arranged, and a data section is arranged after the preamble section. The right side of FIG. 4A shows an envelope detection output of the detection section 22 with a bold line in FIG. 2 in the case of receiving an OFDM signal (broken line) on the left side of FIG. 4A.

The left side of FIG. 4B shows an example in which the level of the data section changes. The wireless LAN packet on the left side of FIG. 4B has a waveform in which a pulse part with a relatively large amplitude and a part with a sufficiently small amplitude which continues for a relatively long period are repeated. As for the transmission power of a wireless LAN packet, average transmission power continues almost constantly. Therefore, in the wireless LAN packet on the left side of FIG. 4B in which the part with an amplitude of 0 or a small amplitude continues for a relatively long period, the amplitude of the pulse part is large. When the envelope of the wireless LAN packet on the left side of FIG. 4B is detected, the detection output is as shown on the right side of FIG. 4B.

The amplitude of the envelope detection output on the right side of FIG. 4B is sufficiently larger than the amplitude of the envelope detection output on the right side of FIG. 4A. The identifier 23 judges a logical value by comparing the envelope detection output of each wireless LAN packet with a predetermined level. Therefore, as the amplitude of the envelope detection output is larger, the identification accuracy of the identifier 23 can be improved more.

Accordingly, the wireless communication section 13 of this embodiment is adapted to generate a pattern to be a wakeup signal by combining wireless LAN packets in which the pulse peak appears at constant intervals.

In FIG. 3, the wireless communication section 13 converts data to be transmitted to each terminal 12 to a wireless LAN packet of an OFDM signal. The transmitted data is given to a mapping section 31. The mapping section 31 converts information data to information symbol data (I data and Q data), for example, by PSK modulation, QAM modulation or the like. The information symbol data from the mapping section 31 is given to an inverse fast Fourier transform (IFFT) circuit 32.

The IFFT circuit 32 performs inverse fast Fourier transform (hereinafter referred to as IFFT) processing with the use of inputted N data to create an OFDM modulated wave (OFDM symbol) and outputs the OFDM modulated wave to a low-pass filter 33. The low-pass filter 33 removes a harmonic component of the inputted OFDM symbol and outputs the OFDM symbol to a D/A converter 34. The D/A converter 34 converts the inputted OFDM symbol to an analog signal and outputs the analog signal to a frequency conversion section 35.

The frequency conversion section 35 is controlled by a control section 37 to convert the OFDM symbol to a signal of a high-frequency band of the wireless LAN and outputs the signal to a power amplifier 36. The power amplifier 36 is controlled by the control section 37 to amplify the OFDM symbol and transmit the OFDM symbol from the antenna 14. A high-frequency transmission section is configured by the frequency conversion section 35 and the power amplifier 36.

Transistors or field-effect transistors constituting the frequency conversion section 35 and the power amplifier 36 are capable of changing linearity by controlling bias. For example, it is possible to increase output power even under a condition of the same amount of deformation by increasing drain current to change bias. Therefore, it is possible to, when a wakeup signal is transmitted, prevent a wireless LAN packet with a large wave height value from being deformed by switching the bias of the frequency conversion section 35 and the power amplifier 36 to improve linearity.

As described above, the transmitted data is processed into information symbol data of a complex code sequence at the mapping section 31, provided for the IFFT circuit 32, and converted to a signal in a time region at the inverse IFFT circuit 32, and then, the time waveforms on the left side of FIGS. 4A and 4B are obtained.

The OFDM modulated wave is configured by a lot of subcarriers. By assigning the information symbol data from the mapping section 31 to each subcarrier and performing IFFT processing thereof, a baseband OFDM modulated wave is obtained. The number of subcarriers is determined by the number of points N of an IFFT circuit used. The subcarriers are identified by subcarrier indexes in frequency order.

In this embodiment, to obtain the time waveform on the left side of FIG. 4B, the control section 37 performs control so that a code sequence generated by the mapping section 31 becomes such that the same code sequence repeats for the subcarrier indexes of the IFFT circuit 32.

Figure 5:
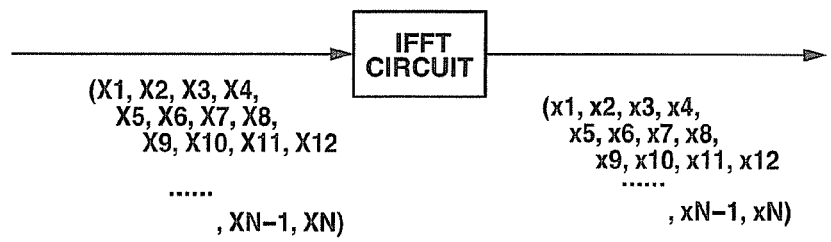
FIG. 5 is a diagram for illustrating a code sequence outputted from a mapping section 31.

FIG. 5 is a diagram for illustrating such a code sequence outputted from the mapping section 31. FIG. 5 shows a signal sequence inputted to the IFFT circuit 32 and a signal sequence outputted from the IFFT circuit 32. The input signal sequence is a signal sequence in a frequency region (X1, X2, X3, X4, . . . , XN), and the output signal is a signal sequence in a time region (x1, x2, x3, x4, . . . , xN). The IFFT circuit 32 assigns N signal sequences on the frequency region to N subcarriers, respectively, to perform IFFT processing. Indexes of the input signal sequences 1 to N correspond to the subcarrier indexes.

In this embodiment, as for a wakeup signal, a signal sequence in which the same pattern is repeated is used as the input signal sequence to be given to the IFFT circuit 32. For example, if there are sixteen subcarriers of the IFFT circuit 32, (S1, S2, S3, S4, S1, S2, S3, S4, S1, S2, S3, S4, S1, S2, S3, S4) is adopted as a sixteen-input-signal sequence (X1, X2, X3, X4, . . . , X16). A repeated cycle can be appropriately set.

In the IFFT circuit 32, when the IFFT processing is performed for such a signal sequence in which the same pattern is repeated, a pulse peak with a predetermined amplitude occurs in an output signal sequence in a repeated cycle, and the amplitude is 0 during the other periods of the output signal sequence. For example, in the case of the above-described input signal sequence in which (S1, S2, S3, S4) is repeated, the output signal sequence is (a1, 0, 0, 0, a2, 0, 0, 0, a3, 0, 0, 0, a4, 0, 0, 0). Thus, the time waveform output shown on the left side of FIG. 4B is obtained. As described above, power concentrates on signal samples the amplitude of which is not 0 in such a time waveform output. Thereby, a wireless LAN packet having a large wave height value can be obtained.

Figure 6:
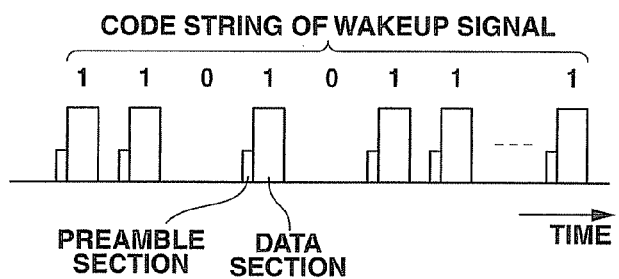
FIG. 6 is a timing chart for illustrating the operation of the first embodiment.

Next, the operation of the embodiment configured as described above will be described with reference to FIG. 6. FIG. 6 is a timing chart showing the code sequence of a wakeup signal.

Now, it is assumed that a predetermined terminal 12 is in the sleep mode. It is assumed that data to be transmitted to the terminal 12 in the sleep mode occurs in the base station 11. In this case, the base station 11 transmits a wakeup signal to the terminal 12. That is, the control section 37 of the wireless communication section 13 controls the mapping section 31 to generate a signal sequence in which the same pattern is repeated. By performing IFFT processing of this input signal sequence, the IFFT circuit 32 generates an OFDM modulated wave in which a pulse peak occurs in a repeated cycle and the level is sufficiently low during the other periods. A high region component is removed from the OFDM modulated wave by the low-pass filter 33, and the OFDM modulated wave is converted to an analog signal by the D/A converter 34, converted to a wireless LAN high-frequency band by the frequency conversion section 35, amplified by the power amplifier 36, and outputted from the antenna 14.

FIG. 6 shows a wakeup signal generated as described above. A wireless LAN packet is configured by a preamble section and a data section. The data section is an OFDM modulated wave generated by an input signal sequence in which the same pattern is repeated. As described above, a wakeup signal is generated by arranging such wireless LAN packets that the wave height value in the data section is enough large, according to the pattern of the wakeup signal. FIG. 6 shows such a wakeup signal that the logical value is "1101011 . . . 1".

In the terminal 12 in the sleep mode, only the power supply control section 16 is operating by the waiting power supply section 19. The power supply control section 16 selects a high-frequency band of the wireless LAN from output of the antenna 15 at the tuning section 21, and detects an envelope at the detection section 22. An envelope detection output is given to the identifier 23, and the identifier 23 converts the envelope detection output to a logical value by comparison with a predetermined threshold. Because the wave height value of the data section of a wireless LAN packet is sufficiently large as described above, it is possible to certainly identify a logical value from comparison with the predetermined threshold even when the accuracy of the tuning section 21 and the detection section 22 is relatively low. By receiving the wakeup signal in FIG. 6, the identifier 23 acquires the logical value "1101011 . . . 1".

The correlation detection section 24 determines correlation between the logical value pattern detected by the identifier 23 and a logical value pattern set as a wake-up signal for the terminal 12 including the correlation detection section 24 and detects that a wakeup signal has been received. An output from the correlation detection section 24 is given to the power supply control signal output section 25, and the power supply control signal output section 25 outputs a power supply control signal for turning on the main power supply section 20 configured to supply power to the wireless communication section 17 and the main body function section 18. In this way, the terminal 12 in the sleep mode can be turned on at any timing by a wakeup signal from the base station 11.

Thus, in this embodiment, it is possible to generate a wireless LAN packet having a large wave height value almost without changing the circuit configuration of an existing wireless LAN transmission section, and a wakeup signal in a pseudo on/off keying waveform in conformity with the wireless LAN specifications is generated with the use of this wireless LAN packet having a large wave height value. Thereby, it is possible to certainly receive a wakeup signal even when the receiving capability of a terminal is relatively low, and it is possible to certainly receive a wakeup signal and causes the mode to transition to the active mode even when power consumption of a terminal in the sleep mode is sufficiently lowered.

Second Embodiment

Figure 7:
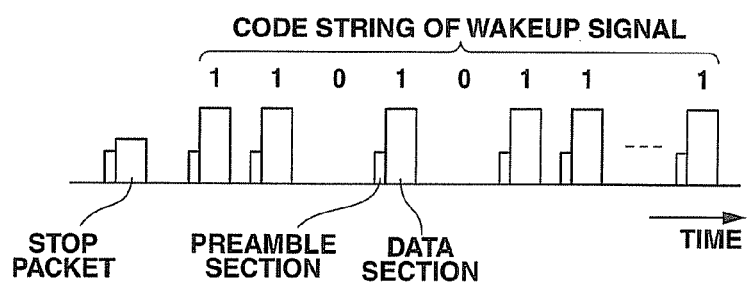
FIG. 7 is a timing chart showing a second embodiment of the present invention.

FIG. 7 is a timing chart showing a second embodiment of the present invention. This embodiment is different from the first embodiment only in that control by the control section 37 in FIG. 3 is different from that of the first embodiment.

In a wireless LAN, multiple wireless LAN terminals share and use RF channels. A wireless LAN terminal is adapted to monitor the signal strength of the RF channels and transmit a packet when other wireless LAN terminals do not perform transmission. Therefore, there is a possibility that, during the off period in the on/off keying waveform corresponding to a logical value "0", other wireless LAN terminals recognize that the RF channel has space and transmit a packet. When a wireless LAN terminal other than the base station 11 transmits a packet, the receiving waveform of a wakeup signal is distorted.

Accordingly, in this embodiment, the control section 37 of the wireless communication section 13 of the base station 11 is adapted to transmit a wireless LAN packet for stopping transmission by other terminals (hereinafter referred to as a stop packet) before transmitting a wakeup signal. A wireless LAN packet includes a timer value (NAV (Network Allocation Vector)) indicating time during which a channel is to be occupied. Wireless-LAN-compatible equipment is adapted to stop transmission in accordance with the timer value.

In this embodiment, a wakeup signal is protected by the control section 37 transmitting a stop packet in which a timer value is set on the basis of a wakeup signal transmission period. FIG. 6 shows an example in which such a stop packet is transmitted immediately before a wakeup signal.

When receiving the stop packet, the wireless communication section 17 of the terminal 12 stops transmission of a wireless LAN packet for a predetermined period required for transmission of the wakeup signal. That is, since even a terminal 12 in the active mode stops transmission of a wireless LAN packet for a predetermined time after receiving the stop packet, the wakeup signal from the base station 11 can be certainly received by a terminal 12 which is to receive the wakeup signal without being influenced by other wireless LAN packets.

As described above, in this embodiment also, advantages similar to those of the first embodiment can be obtained, and it is possible to prevent a wakeup signal from being badly influenced by transmission from a terminal and enable certain receiving by a terminal.

Third Embodiment

FIG. 8 is a timing chart showing a third embodiment of the present invention. This embodiment is different from the first embodiment only in that control by the control section 37 in FIG. 3 is different from that of the first embodiment.

In a wireless LAN, it is generally possible to perform communication via multiple channels. It is conceivable that, even when a stop packet is generated to transmit a wakeup signal via a particular channel, a wireless LAN packet is transmitted via a channel of a band adjoining the channel. As described above, it is desirable that the circuit configuration of the power supply control section 16 is as simple as possible, from the viewpoint of low power consumption. Therefore, it is conceivable that the degree of channel selectivity of the power supply control section 16 is relatively low.

It is conceivable that, when the degree of channel selectivity is relatively low, a wakeup signal cannot be normally received due to influence of signal power of a wireless LAN packet transmitted via a channel adjoining a channel for transmitting the wakeup signal.

Accordingly, in this embodiment, the control section 37 is adapted to transmit a stop packet not only for a channel for transmitting a wakeup signal but also for channels of bands adjoining the channel in order to stop transmission of a wireless LAN packet from other terminals.

FIG. 8 shows an example of transmission of stop packets in this embodiment. FIG. 8 shows the state of transmission of wireless LAN packets indicated by square frames, for channels having the center frequencies of fa, fb and fc, respectively. The bottom part of FIG. 8 shows an envelope detection output of the detection section 22 in a terminal 12 which is set to receive a wireless LAN packet of the channel with the center frequency fb.

It is assumed that the terminal 12 is in the sleep mode, and that the base station 11 transmits a wakeup signal to this terminal 12 using the channel with the center frequency fb. That is, the wireless communication section 13 of the base station 11 transmits a wakeup signal after transmitting stop packets, using the channel with the center frequency fb.

In this embodiment, in this case, stop packets are also transmitted to the channels with the center frequencies fa and fc adjoining the channel with the center frequency fb before transmitting a wakeup signal. In the example in FIG. 8, after stop packets are sequentially transmitted to the channel with the center frequency fa, the channel with the center frequency fb and the channel with the center frequency fc in that order, a wakeup signal is transmitted using the channel with the center frequency fb.

The terminal 12 is set to receive the channel with the center frequency fb. However, since the degree of channel selectivity is relatively low, the terminal 12 is influenced by wireless LAN packets of the adjacent channels with the center frequencies fa and fc. After all, the envelope detection output of the detection section 22 of the terminal 12 is that shown at the bottom part of FIG. 8.

As shown in FIG. 8, before a stop packet is received, an envelope detection output is obtained which is influenced not only by the wave height value of wireless LAN packets via the channel with the center frequency fb but also by the wave height values of wireless LAN packets via the channels with the center frequencies fa and fc. In comparison, since stop packets are transmitted to the channels with the center frequencies fa to fc, only a wakeup signal received by the channel with the center frequency fb is received, and an envelope detection output on the basis of the wakeup signal can be obtained. Thereby, the power supply control section 16 can certainly detect the wakeup signal and generate a power supply control signal for turning on the main power supply section 20.

As described above, in this embodiment, advantages similar to those of the first embodiment can be obtained, and it is advantageous that even such a terminal that the degree of channel selectivity of the power supply control section is low can certainly detect a wakeup signal.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A wireless communication apparatus comprising a base station capable of communicating, via a Local Area Network, with one or more terminals having an active mode and a sleep mode as power-supply-on modes, the wireless communication apparatus comprising:

an inverse fast Fourier transform processing section configured to obtain an output signal sequence in a time region by inverse fast Fourier transform processing for an input signal sequence in a frequency region; and a control section configured to cause the inverse fast Fourier transform processing section to output a wakeup signal for causing the terminal in the sleep mode to transition to the active mode, wherein the control section sets a signal sequence that repeats a same pattern as the input signal sequence assigned to subcarrier indexes of the inverse fast Fourier transform processing section.

2. A wireless communication apparatus comprising a base station capable of communicating, via a wireless Local Area Network, with one or more terminals having an active mode and a sleep mode as power-supply-on modes, the wireless communication apparatus comprising:
 an inverse fast Fourier transform processing section configured to obtain an output signal sequence in a time region by inverse fast Fourier transform processing for an input signal sequence in a frequency region; and
 a control section configured to cause the inverse fast Fourier transform processing section to output a wakeup signal for causing the terminal in the sleep mode to transition to the active mode, wherein the control section sets the input signal sequence such that an output of the inverse fast Fourier transform processing section has a pulse peak with a predetermined amplitude in a repeated cycle and an amplitude of 0 during other periods.

3. The wireless communication apparatus according to claim 1, comprising a mapping section configured to convert information data to In-Phase data and Quadrature data; wherein
 the mapping section is controlled, by the control section, to output the signal sequence in which the same pattern as the input signal sequence is repeated for the subcarrier indexes of the inverse fast Fourier transform processing section.

4. The wireless communication apparatus according to claim 1, comprising a high frequency transmission section configured to frequency-convert the output of the inverse fast Fourier transform processing section to a wireless LAN band, amplify the output, and transmit the output via an antenna.

5. The wireless communication apparatus according to claim 4, wherein
 the high-frequency transmission section is configured by a device that linearity changes according to a change in bias; and
 the control section changes the bias to be different at the time of outputting the wakeup signal as compared to other times.

6. The wireless communication apparatus according to claim 1, wherein the control section sets an output of the inverse fast Fourier transform processing section in the case of giving to the inverse fast Fourier transform processing section a signal sequence in which the same pattern is repeated for the subcarrier indexes of the inverse fast Fourier transform processing section as the input signal sequence, as one of logical values, and configures the wakeup signal by a code string configured by a combination of the logical values.

7. The wireless communication apparatus according to claim 6, wherein the control section configures one of the logical values by adding a preamble section to the output of the inverse fast Fourier transform processing section in the case of giving to the inverse fast Fourier transform processing section a signal sequence in which the same pattern is repeated for the subcarrier indexes of the inverse fast Fourier transform processing section as the input signal sequence.

8. The wireless communication apparatus according to claim 1, wherein the control section causes a packet for stopping transmission from the terminal to be transmitted, before the wakeup signal is transmitted.

9. The wireless communication apparatus according to claim 1, wherein the control section causes the packet for stopping transmission from the terminal to be transmitted for channels of bands adjoining a channel for transmitting the wakeup signal.

10. A wireless communication apparatus comprising: one or more terminals having an active mode and a sleep mode as power-supply-on modes; and a base station capable of communicating with the one or more terminals via a wireless Local Area Network (LAN), wherein
 the base station comprises:
 an inverse fast Fourier transform processing section configured to obtain an output signal sequence in a time region by inverse fast Fourier transform processing for an input signal sequence in a frequency region; and
 a control section configured to cause the inverse fast Fourier transform processing section to output a wakeup signal for causing the terminal in the sleep mode to transition to the active mode, wherein the control section sets a signal sequence that repeats a same pattern as the input signal sequence to be assigned to the subcarrier indexes of the inverse fast Fourier transform processing section; and
 the terminal comprises:
 a power supply control section configured to receive, during the sleep mode, the wakeup signal transmitted from the base station and detect the wakeup signal on the basis of an envelope detection output of the wakeup signal, wherein the wakeup signal causes the terminal to transition from the sleep mode to the active mode.

11. The wireless communication apparatus according to claim 10, wherein the control section causes the output of the inverse fast Fourier transform processing section to have a pulse peak with a predetermined amplitude in a repeated cycle and have an amplitude of 0 during other periods by giving to the inverse fast Fourier transform processing section a signal sequence in which a same pattern is repeated for subcarrier indexes of the inverse fast Fourier transform processing section as the input signal sequence.

12. The wireless communication apparatus according to claim 10, wherein the terminal comprises a waiting power supply section configured to continuously supply power to the power supply control section.

13. The wireless communication apparatus according to claim 10, wherein the terminal comprises a main power supply section configured to generate power supply voltage in the active mode.

14. The wireless communication apparatus according to claim 10, wherein the terminal comprises a wireless communication section configured to operate in the active mode to transmit and receive data to and from the base station.

15. The wireless communication apparatus according to claim 10, wherein
 the power supply control section comprises:
 an identification section configured to convert an envelope detection output of the wakeup signal to a logical value; and
 a correlation detection section configured to detect the wake up signal based on a correlation between an output of the identification section and an already-known pattern.

16. The wireless communication apparatus according to claim 10, wherein
 the base station comprises a high frequency transmission section configured to frequency-convert and amplify the output of the inverse fast Fourier transform processing section to a wireless LAN band and transmit the output via an antenna;

the high-frequency transmission section is configured by a device that linearity changes according to a change in bias; and the control section changes the bias to be different at the time of outputting the wakeup signal as compared to other times.

17. The wireless communication apparatus according to claim 10, wherein the control section causes a packet for stopping transmission from the terminal to be transmitted, wherein the packet is transmitted before the wakeup signal is transmitted.

18. The wireless communication apparatus according to claim 10, wherein the control section causes the packet for stopping transmission from the terminal to be transmitted for channels of bands adjoining a channel for transmitting the wakeup signal.

* * * * *